(12) United States Patent
Stenroth (10) Patent No.: US 11,420,317 B2
(45) Date of Patent: Aug. 23, 2022

(54) LOCATIONING DEVICE FOR A MACHINING POINT ON A WORKPIECE

(71) Applicant: Rock Roots Oy, Sipoo (FI)

(72) Inventor: Andreas Stenroth, Sipoo (FI)

(73) Assignee: Rock Roots Oy, Sipoo (FI)

( * ) Notice: Subject to any disclaimer, the term of this patent is extended or adjusted under 35 U.S.C. 154(b) by 443 days.

(21) Appl. No.: 16/622,714

(22) PCT Filed: Jun. 18, 2018

(86) PCT No.: PCT/EP2018/066120
§ 371 (c)(1),
(2) Date: Dec. 13, 2019

(87) PCT Pub. No.: WO2018/229298
PCT Pub. Date: Dec. 20, 2018

(65) Prior Publication Data
US 2020/0180137 A1   Jun. 11, 2020

(30) Foreign Application Priority Data

Jun. 16, 2017 (FI) ........................... 20175562

(51) Int. Cl.
| | |
|---|---|
| *G01B 7/14* | (2006.01) |
| *B25H 1/00* | (2006.01) |
| *B23Q 17/00* | (2006.01) |
| *G01B 11/14* | (2006.01) |
| *G01B 21/04* | (2006.01) |
| *B23Q 17/20* | (2006.01) |

(52) U.S. Cl.
CPC ......... *B25H 1/0071* (2013.01); *B23Q 17/003* (2013.01); *G01B 7/14* (2013.01);
(Continued)

(58) Field of Classification Search
CPC .. B25H 1/0071; B25H 1/0064; B23Q 17/003; B23Q 17/20; B23Q 2716/00;
(Continued)

(56) References Cited

U.S. PATENT DOCUMENTS

2004/0262020 A1* 12/2004 Arntson ................. B23Q 17/22
                                                                173/32
2005/0251985 A1* 11/2005 Arntson ................. B23Q 17/22
                                                                29/407.01
(Continued)

FOREIGN PATENT DOCUMENTS

| CN | 203471157 U | 3/2014 |
|---|---|---|
| CN | 105865355 A | 8/2016 |

(Continued)

OTHER PUBLICATIONS

International Search Report issued in PCT/EP2018/066120, dated Aug. 28, 2018, 2 pages.
(Continued)

*Primary Examiner* — Yaritza Guadalupe-McCall
(74) *Attorney, Agent, or Firm* — Eversheds Sutherland (US) LLP (57) ABSTRACT

A device for determining a location on an elongated workpiece, characterized in that the device comprises: a frame movable in a first direction, preferably in a longitudinal direction of the workpiece, positioning means to position the frame in relation to the sides of the workpiece, movable means movable in a second direction, preferably in a transverse direction with respect to the frame, a measuring point, the movement in first direction and second direction used to move measuring point in said directions, measuring equipment for determining the location of the measuring point in transverse and longitudinal respect to the workpiece.

17 Claims, 8 Drawing Sheets

(52) U.S. Cl.
CPC ............ *G01B 11/14* (2013.01); *G01B 21/047* (2013.01); *B23Q 17/20* (2013.01); *B23Q 2716/00* (2013.01); *B23Q 2717/00* (2013.01)

(58) Field of Classification Search
CPC .. B23Q 2717/00; B23Q 17/2291; G01B 7/14; G01B 11/14; G01B 21/047; G01B 5/0004; G01D 5/165
See application file for complete search history.

(56) References Cited

U.S. PATENT DOCUMENTS

| | | | |
|---|---|---|---|
| 2005/0265798 A1* | 12/2005 | Boyl-Davis | B23Q 9/0014 408/76 |
| 2006/0159539 A1* | 7/2006 | Boyl-Davis | B23Q 9/0042 409/178 |
| 2020/0180137 A1* | 6/2020 | Stenroth | G01D 5/165 |

FOREIGN PATENT DOCUMENTS

| | | |
|---|---|---|
| DE | 102008049821 A1 | 4/2010 |
| JP | 2005300478 A | 10/2005 |
| JP | 2015213939 A | 12/2015 |

OTHER PUBLICATIONS

Search Report issued in Finnish Application No. 20175552, dated Oct. 9, 10, 2017, 2 pages.
Charles L. Caristan. Laser Cutting Guide for Manufacturing. In: Courtesy Trumpf, Inc., Society of Manufacturing Engineers, 2004, p. 11, ISBN 0-087263-686-0. figures 1-3, 1-6, 1-11.

* cited by examiner

Figure 3c

LOCATIONING DEVICE FOR A MACHINING POINT ON A WORKPIECE

CROSS-REFERENCE TO RELATED APPLICATIONS

This application is a national stage application, filed under 35 U.S.C. § 371, of International Application No. PCT/EP2018/066120, filed on Jun. 18, 2018, which claims priority to Finland Patent Application No. 20175562, filed on Jun. 16, 2017, the entire contents of each of which are hereby incorporated herein by reference in their entirety for all purposes.

FIELD OF THE INVENTION

Generally the present invention relates to measuring equipment. In particular, however not exclusively the present invention pertains to devices for determining location on a workpiece.

BACKGROUND

Traditionally when boring holes or measuring points on a workpiece, such as a beam, the user has to manually measure and mark the points on the beam in accordance with schematics. The manual measurements are done in relation to the beam and accuracy is totally dependent on the accuracy of the different measuring devices, such as a roll measure, and the proficiency of the worker using them.

Additionally the beams may vary in dimensions and the schematics might not correspond to the actual beam dimensions that further decreases the accuracy of the measured points. After the dimensions have been measured usually machining such as drilling, coping or welding takes place at the measured points or lines. Typically fastening devices such as magnetic capabilities in the drill or a dedicated workstand is used to secure the machining device directly on to the beam.

The fastening means to secure a machining device on the workpiece vary. To some degree the material of the workpiece determines some of the means that may be used. However, attaching the device to the beam after the measurement has been done has a potential for further decrease in accuracy of the final machined hole in relation to the schematics. The user of the machine has to place the machine correctly and accurately in relation to the beam so that the right hole is bored but also so that the machine is securely fastened to the workpiece so that it doesn't move. Again due to the extent of manual effort this creates long process before the actual machining is done and additionally the process has many steps and techniques that cause potential for inaccuracy.

Additionally, CNC (Computerized Numerical Control) machine arrangements are known from the prior art wherein a workpiece is guided and machined through a big apparatus which measures, conveys and machines a workpiece as it travels through the CNC machine. These apparatuses are however big in size, complex in structure, not manually operable (except via a computer user interface) and they cost more than typical manual measuring means.

SUMMARY OF THE INVENTION

The objective is to at least alleviate the problems described hereinabove not satisfactorily solved by the known arrangements, and to provide a feasible solution for manually operable locationing device for a workpiece.

The main advantage of the device in accordance with the present invention is that it comprises all the necessary measuring means incorporated in the device itself. This has a benefit of easier use and the solution is hence less prone to user error and inaccuracy.

One further advantage of the device in accordance with the present invention is that the arrangement is completely manually operable and that it may be quickly moved from workpiece to another and calibrated in relation to the workpiece.

Further advantage of the present invention is that it allows for attachment of a tool to the device wherein the point or line to be measured is done directly in accordance with the tool.

A further advantage of the present invention is that it allows for accuracy that is sufficient in regards to relevant workpiece measuring and machining standards for a wide range of measured distances. This is an important advantage when working with e.g. elongated workpieces such as beams and girders that may require both small distance and longer distance measurements wherein the accuracy of those measurements should stay in the tolerances set by relevant standards. The present invention is preferably aimed at elongated workpieces but its features and the core invention may encompass also other shapes as is clear to a person skilled in the art.

The technical effect of the present invention is that a user can place the device on any longitudinal workpiece, such as an I-beam or an H-beam, position the device on the workpiece by fixing the device to the sides to the workpiece with the positioning means, and manually move the device on the workpiece and do measurements at the device itself in relation to the workpiece without moving said workpiece, which workpieces are usually heavy and require a lot of space for movement and often motor-assistance.

The aforesaid objectives are achieved by the embodiments of a device in accordance with the present invention.

Accordingly, in one aspect of the present invention a device for determining a location on an elongated workpiece, characterized in that the device comprises:
- a frame movable in a first direction, preferably in a longitudinal direction of the workpiece, consequently moving the whole device on the workpiece in said direction,
- positioning means to position the frame in relation to the sides of the workpiece, wherein the positioning means fix the frame so that the frame doesn't move in a second direction but so that the frame may move in the longitudinal direction of the workpiece,
- movable means movable in the second direction, preferably in a transverse direction in relation to the workpiece and with respect to the frame,
- a measuring point, the movement in first direction and second direction being used to move measuring point in said directions,
- measuring equipment for determining the location of the measuring point in transverse and longitudinal respect to the workpiece.

In one embodiment of the present invention the device further comprises second movable means for moving the measuring point perpendicularly in relation to the workpiece.

In one embodiment of the present invention the measuring equipment comprises at least one laser distance meter for measuring the longitudinal distance to a point of reference such as one end of the elongated workpiece.

In another embodiment of the present invention the measuring equipment comprises at least two laser distance meters for measuring the distance to two points of references preferably on opposite sides of the frame.

In one embodiment of the present invention the point of reference comprises a counterpart for reflecting a laser beam of the laser distance meter.

In one embodiment of the present invention the measuring equipment comprises an optical sensor for measuring movement in the second direction, which optical sensor detects distance by moving linearly with the movable means in the transverse direction in relation to a surface of the frame of the device and/or surface of the workpiece.

In one embodiment of the present invention the measuring equipment comprises a magnetic sensor for measuring movement in the second direction, which magnetic sensor detects distance by moving linearly with the movable means in the transverse direction in relation and in connection with a magnetic strip on the frame of the device.

In one embodiment of the present invention the measuring equipment comprises an optical sensor for measuring movement in the second direction, which optical sensor detects distance from rotational movement of a leadscrew used to move the movable means.

In one embodiment of the present invention the device comprises attachment means for attaching tools to the frame. The attachment means may comprise a cradle with friction grip support for a magnetic drill. The attachment means may comprise a cradle and band attachment means for facilitating a magnetic drill. The attachment means may also comprise a cradle with some other friction grip means for gripping onto the tool or the cradle may comprise physical structures that carry the weight of the tool thereon. The cradle may comprise rolling sphere units facilitating movement and load transfer between the workpiece and the tool on the cradle.

In one embodiment of the present invention the measuring point comprises a center punch and/or allows the use of a center punch, preferably through a hole.

In one embodiment of the present invention the measuring equipment comprises an angle sensor, preferably functionally connected to the attachment means, for determining the position of the attached tool.

In one embodiment of the present invention the positioning means comprise rolls facilitating longitudinal movement of the frame.

In one embodiment of the present invention the measuring equipment comprises pulse sensors functionally connected at the rolls of the positioning means for measuring the longitudinal movement of the frame on the workpiece. This measurement may be used together with the laser distance measurement for more accurately measuring the longitudinal movement and the position of the frame on the workpiece In one embodiment of the present invention the device comprises rolling means at the bottom of the frame facilitating longitudinal movement of the frame.

In one embodiment of the present invention the measuring equipment comprises pulse sensors at the rolling means for measuring the longitudinal movement of the frame on the workpiece.

In one embodiment of the present invention the device comprises a user interface such as a display for reading the measured value.

The utility of the present invention follows from a plurality of factors depending on each particular embodiment.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

Figure 1A:
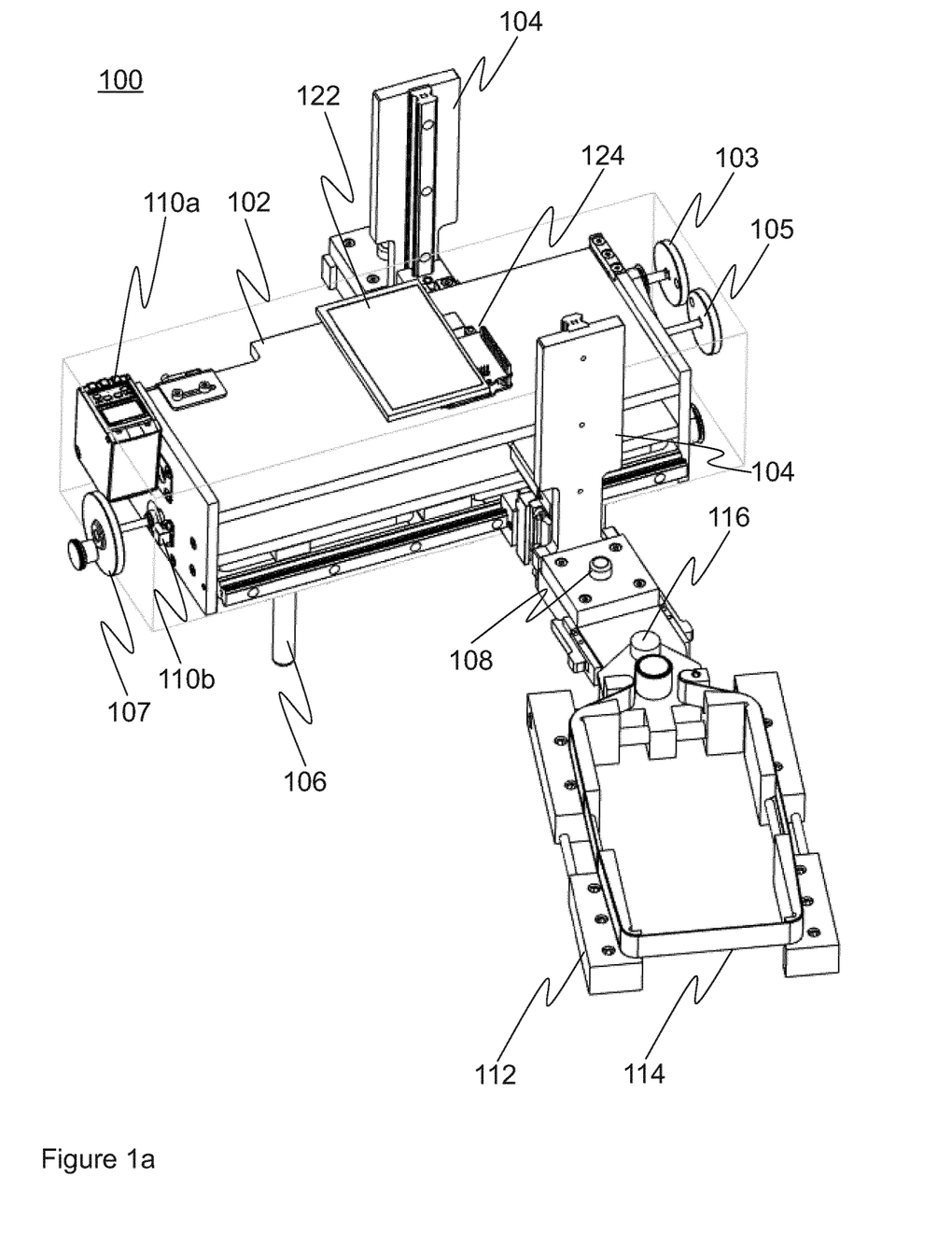
FIGS. 1a and 1b illustrate upper views of embodiments of the device in accordance with the present invention.
Figure 1B:
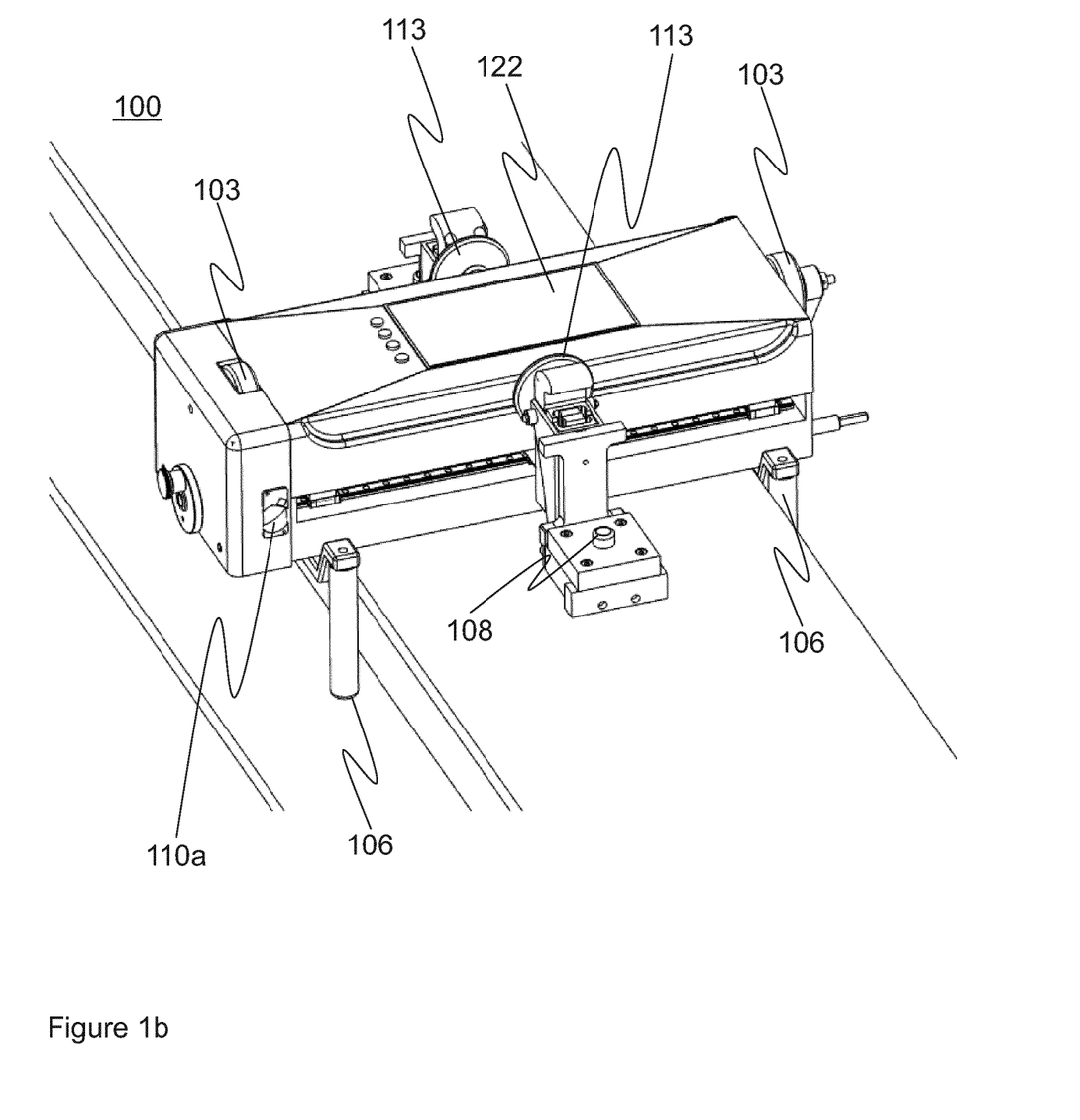
Figure 1C:
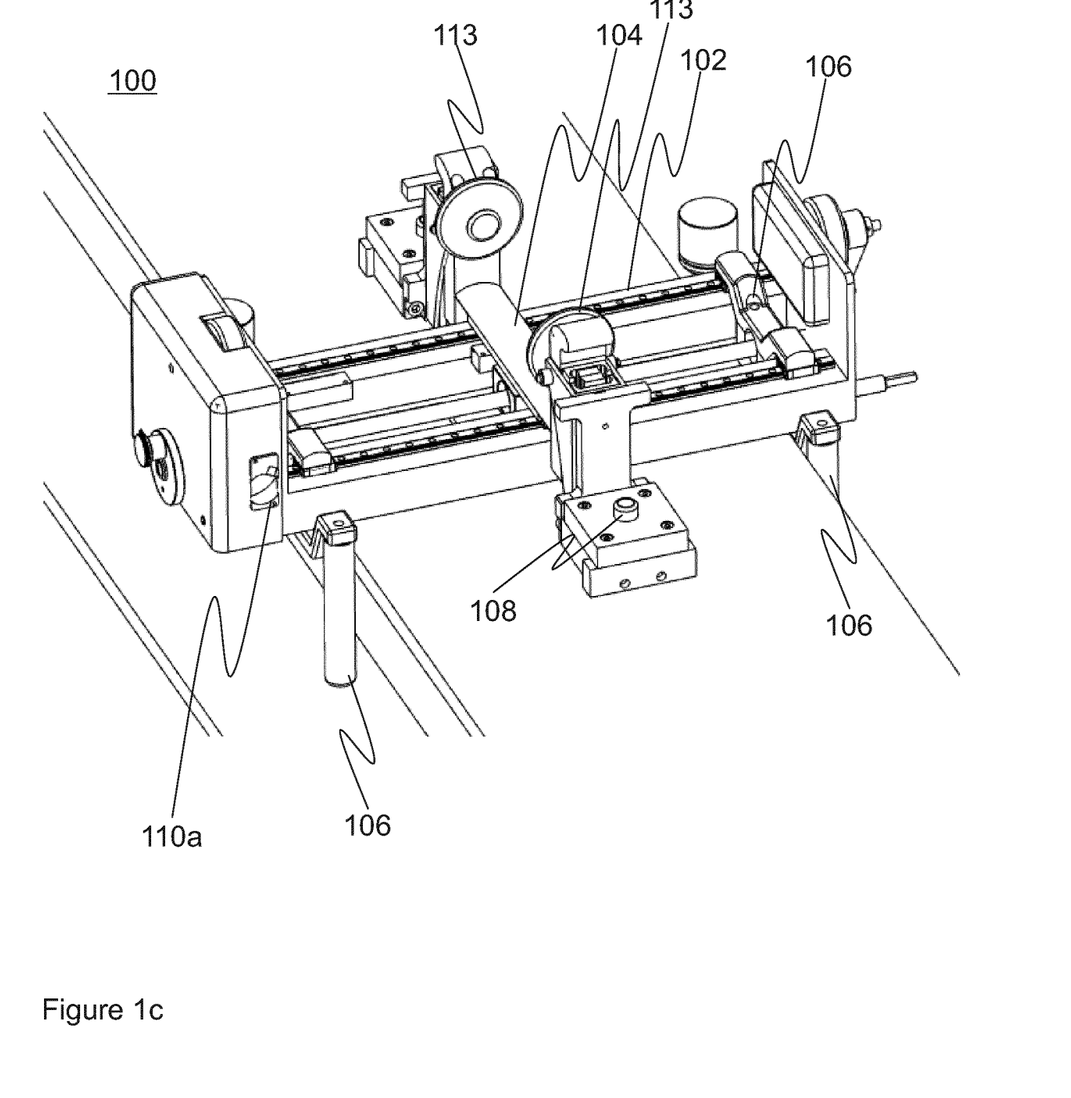
FIG. 1c illustrates an upper view of an embodiment of the device in accordance with the present invention without casing.
Figure 1D:
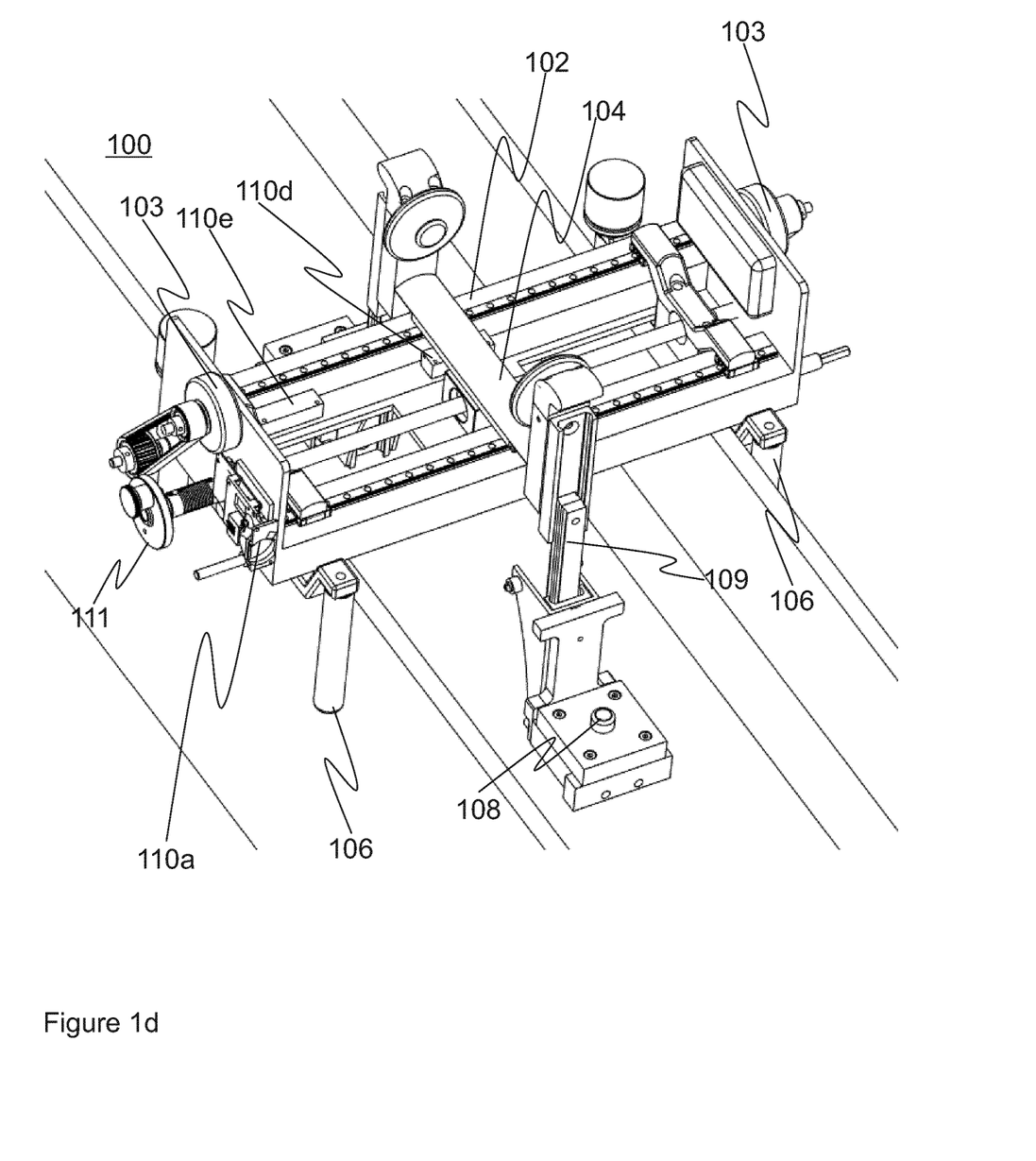
FIG. 1d illustrates an upper view of an embodiment of the device in accordance with the present invention.

Referring to FIGS. 1a-1d, the device 100 comprises a frame 102 that is movable in a first direction, preferably the longitudinal direction of an elongated workpiece such as a bar or I-beam (FIGS. 1b and 1c) or an H-beam (FIG. 1d). The device 100 further comprises first movable means 104 connected to the frame 102 for facilitating transverse movement with respect to the workpiece and the frame 102. The device 100 further comprises positioning means 106 for fixing the frame 102 to the workpiece. Further, a measuring point 108 is connected to the movable means 104. The device 100 also comprises measuring equipment 110a, 110b, 110c, 110d, 110e for determining the location of the measuring point 108.

The first movable means 104 comprises preferably an arrangement that moves in relation to the frame 102 and the workpiece such as that the measuring point 108 moves in a transverse direction. Therefore the movable means 104 constitutes a moving support for the measuring point 108 and the other one or more tools that may be attached to the device 100. The movable means 104 hence is a tool support part of the device 100. Because the movable means 104 is movable in relation to the frame 102 the measuring point 108 or other tool thereof location may be adjusted in a transverse direction without having to move the whole device 100. The frame 102 may comprise e.g. linear tracks on which the movable means 104 may move in a fixed manner in relation to the frame 102. The transverse movement may be facilitated by a leadscrew or drive screw, which may be turned by a turning knob or the like at one end of the leadscrew or drive screw. The first movable means are preferably arranged to move the measuring point 108 in transverse direction, such as that movement in longitudinal direction is not connected to the transverse movement.

The first movable means 104 may also comprise at least one rolling knob 113 and arrangement thereof for fine adjusting the transverse position. The rolling knob 113 may be arranged to be movable against the casing of the device 100 e.g. with fingers. The one or more rolling knobs 113 may be arranged to only come into contact with the casing when pressed down (e.g. by 1 mm) so the fine adjustment may be done by first pressing the rolling knob down and then rolling the knob with fingers.

The device may also comprise second movable means 109 for moving the measuring point vertically in relation to the workpiece surface, preferably perpendicularly closer or farther from the workpiece surface. The measuring equipment 110a, 110b, 110c, 110d, 110d needn't necessarily comprise means for determining the vertical distance from the device to the workpiece surface because the measurements for a girder or such workpiece are usually done in relation to the workpiece two-dimensional surface. This way the second movable means may be simply used to get closer to a workpiece surface in relation to the point determined in first and second directions as depicted in FIG. 1d. The second movable means 109 are preferably connected to the first movable means 104 so that the second movable means 109 and consequently the measuring point 108 are moved horizontally in relation to the workpiece when the first movable means 104 are moved. The second movable 109 means may comprise linear tracks for moving linearly closed or farther from the workpiece surface.

The positioning means 106 enable fixing the device 100 to the workpiece at the sides of the workpiece. The positioning means 106 comprise for example rolls that are moved against the sides of the workpiece wherein the movement is arranged such that they move in symmetrically outwards or towards the sides of the workpiece. To elaborate, the positioning means are used to fix and position the device 100 to the workpiece such as that the device 100 may be moved in the first direction in relation to the workpiece but preferably also such that the device 100 is hindered from freely moving in the transverse direction in relation to the workpiece. The movement in first direction is preferably facilitated by using four rolls for two sides of the workpiece as illustrated. These rolls allow the device to be moved along the workpiece whereas the transverse movement in relation to the workpiece is done by the movable means 104. The positioning means 106 may be controlled by a leadscrew or a drive screw which may be controlled by a turning knob 107 or the like at one end of the screw of the positioning means 106. The positioning means 106 may be controlled by two interconnected drive screws which may be controlled by a turning knob 111 or the like at one end of the screws of the positioning means 106. The drive screws are preferably arranged such that the other has a right-hand helix and the other left-hand helix such as that the positioning means 106 moves synchronously from both sides of the device 100 to either tighten to or to release from workpiece sides.

The positioning means 106 may also comprise a strap between two rolls at each one side of the device. This strap may allow the positioning means 106 to be moved synchronously also in the longitudinal direction such that two rolls at each side move against the workpiece synchronously or that the strap attaches to the side of the workpiece and delivers the movement between the side of the workpiece and the rolls. The strap may be looped around the rolls.

The measuring point 108 constitutes a point whose location is moved by moving the device 100 on the workpiece. The location of the measuring point 108 is measured directly or it is used as a reference point in relation to which measurements may be made. The measuring point 108 may comprise a center punch for marking a point in the workpiece. The center point may be the center of a drill hole, for example. Alternatively, the measuring point 108 comprises a hole for a center punch, and a separate center punch or pen may be used to mark a center point through the hole. The measuring point 108 may hence comprise a physical point of the device or a reference point to which a measured point or line may be defined.

The device 100 further comprises longitudinal measuring equipment 110a for determining the longitudinal location of the measuring point 108 with respect to the workpiece. The longitudinal distance is preferably measured from one end of the workpiece in relation to the reference point 108. The longitudinal measuring equipment 110a may comprise a laser distance meter measuring the distance to a point of reference such as the longitudinal end of the workpiece. The laser distance meter may be arranged in the frame 102 wherein the laser equipment is situated at the frame such that the measurement may be done unobstructed by the dimensions of the device 100. Further, the laser distance meter is preferably a component that may be connected to the processor of the device. Alternatively the laser distance meter may be a dedicated measurement device that has a processor of its own to measure the longitudinal distance. Clearly, the measuring equipment may be situated in many different locations of the device 100 and the calculation of the measuring point 108 in relation to the measuring equipment reading may be done internally in the device in view of the device 100 configuration, dimensions, etc.

A counterpart may be arranged to a point of reference so that the laser beam is reflected from the counterpart. For example, a counterpart may be arranged at the end of the workpiece so that the laser distance meter measures the distance to that end of the workpiece. Alternatively, the device 100 may comprise at least two laser distance meters that measure the distance to at least two reference points. Therein the two laser distance meters may be located on opposite sides of the frame 102. For example, the two reference points may be located in each end of the workpiece so that the at least two distance meters measures the distance to each end. The counterpart may be such that almost any surface or object induced reflection is suitable and hence no particular reflection surface is required. However, a dedicated counterpart is not mandatory to the functioning of the device although it may be used to improve the accuracy of the measurements done with the device. Especially a white-colored surface of the counterpart may be used improve the accuracy of the longitudinal measurement. However, also a wall of a building, another beam, such as an intersection of beams or a bend at the beam, or a point at a stand whereon the workpiece is laid may be used for facilitating reflection for the laser device measurements.

The measuring equipment for determining the longitudinal distance and location may comprise mechanical tape measure roll wherein measuring is done at the device 100 but the tape may be drawn to the side or end(s) of the workpiece. Such means may also be used to determine the transverse distance from at least one side of the elongated workpiece.

The device 100 may further comprise attachment means 112 for attaching tools to the device 100. The attachment means 112 may comprise a band arrangement 114 for facilitating grip around a tool. The attachment means may also comprise a cradle with some other friction grip means for gripping onto the tool or the cradle may comprise physical structures that carry the weight of the tool thereon.

The cradle may comprise rolling sphere units facilitating movement and load transfer between the workpiece and the tool on the cradle. The tool may be a magnetic drill or an angle rule, for example. The attachment means 112 may comprise an angle sensor 116 (potentiometer) for determining the position of the attachment means 112 in relation to the frame 102 and consequently the location of the tool thereof. For example, the angle sensor 116 may be arranged to determine the location of a magnetic drill bit and drilling point in relation to the measuring point 108. Therefore, the measuring point may be used as a point of reference such that the device 100 may directly determine a position for a tool and location thereof that is machined with the tool. The attachment means 112 may be pivotally attached to the movable means 104 so that the attachment means 112 are rotatable in relation to the workpiece. Therefore different tools may and measured locations thereof may be situated at the attachment means 112. Preferably a pin is used to connect the angle sensor and/or other measuring sensors and optionally the tool at the attachment means 112 thereof to the processor 124 of the device. The angle sensor 116 may be arranged to the device 100 or the device 100 may simply comprise means to connect to an external angle sensor such as an angle sensor in an tool cradle or jig that is attached to the device 100 at the attachment means 112.

The attachment means 112 may comprise a band arrangement 114 or similar for facilitating a grip on a tool. The band may be for example nylon or polymer band that is fastened with a ratchet. This is especially suitable for a magnetic drill, which may be attached to the device 100 such as to move to a location to be drilled and after positioning the drill in relation to the point the magnet may be turned on the drill is instantly positioned to the right point. The attachment means 112 preferably also comprises rolling sphere units 120 that may comprise suspension for facilitating movement and load transfer between the workpiece and the tool on the cradle allowing the drill to be moved freely over the workpiece when the magnet is not turned on and to give in and allow the magnet drill to come into contact with the workpiece surface when the magnet of the magnetic drill is turned on. However, also other types of suitable rolling means may be used.

The solution is aimed at metal workpieces but solution is also usable for workpieces comprising other materials such as wood or polymer.

Figure 2:
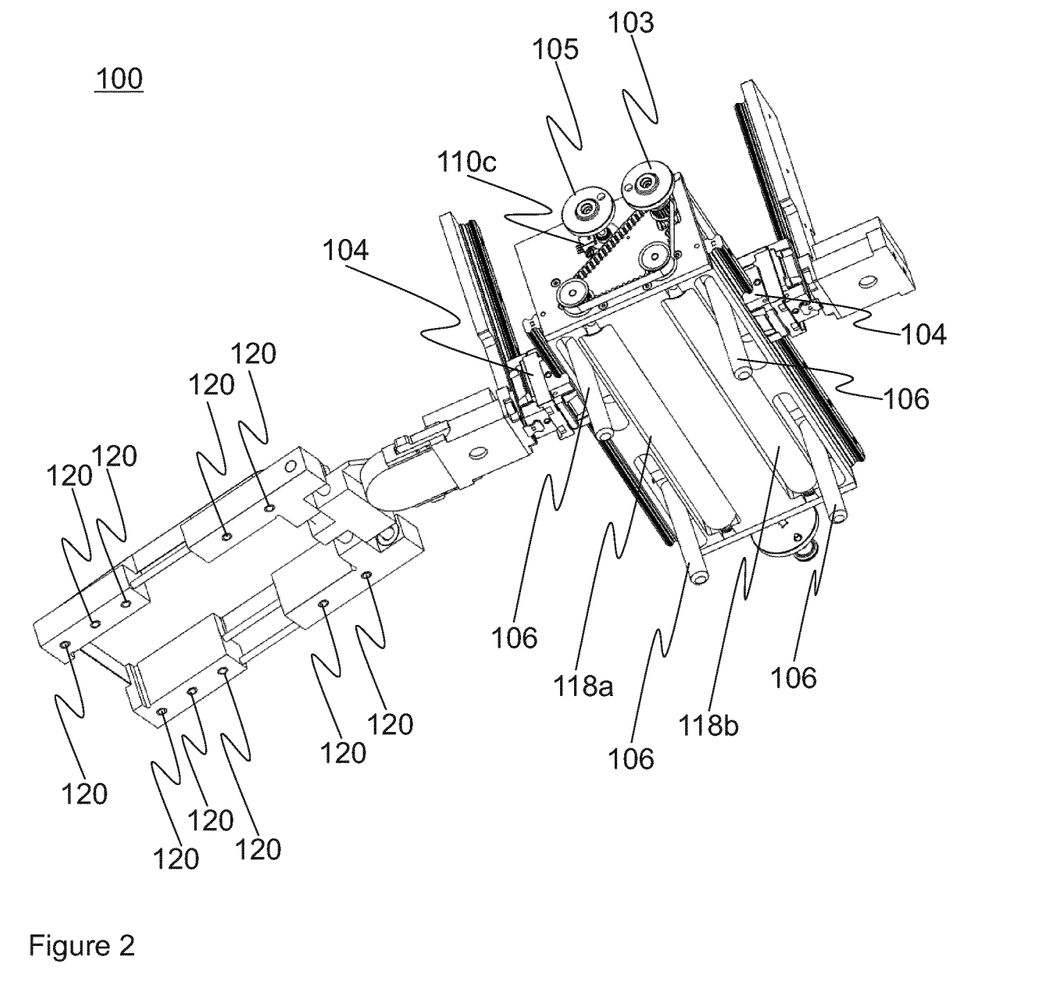
FIG. 2 illustrates a bottom view of an embodiment of the device in accordance with the present invention.

Referring to FIG. 2, the movable means 104 and the fastening means 106 are illustrated more closely.

The movable means 104 comprise a part that is moved in relation to the transverse direction of the workpiece. The movable means 104 is facilitated by the part moving via a drive screw or a leadscrew that is turned with a knob 105 at the end of the screw on either side of the frame 102 or by hand by pushing the movable means and/or fine adjusting with another knob 113. The transverse movement is measured preferably with an optical sensor 110c such a pulse sensor. The pulse sensor 110c may be situated at the end of the screw, such as that rotating the knob rotates a plate in between a pulse sensor 110c wherein the rotation may be measured as pulses and the pulses may be further translated into a measure of transverse movement.

Optionally, the pulse sensor may be arranged to the movable means 104 such as that the sensor 110c moves linearly with the movable means and measures its own location in reference to a surface of the frame or to the surface of the workpiece. Therein the sensor 110c itself is in the moving part and the pulses are situated at a rail, track, leadscrew or a surface as mentioned before in relation to which the movable means move.

The transverse movement may be optionally measured with a magnetic sensor arrangement such as a magnetic sensor 110d moving in relation and at least functional connection to a magnetic strip. The magnetic sensor 110d may be arranged to the movable means 104 such as that the sensor 110d moves linearly with the movable means 104 and measures its movement in reference to the magnetic strip on the frame 102 surface. Therein the magnetic sensor 110d itself is in the moving part and the magnetic strip is fixed on the frame 102 surface so that the magnetic sensor travels against the magnetic strip when the movable means 104 are moved.

The positioning means 106 are preferably moved by a trapezoidal leadscrew or a drive screw for moving the rolls against the workpiece therefore facilitating tight and secure fixing of the frame 102 in relation to the workpiece. As mentioned the rolls facilitate both fixing of the frame to workpiece and moving the frame 102 in relation to the workpiece. Further the positioning of the frame to the workpiece is preferably done sufficiently tight to the workpiece such as not to allow slack movement in transverse direction. For this purpose ratchet or such tightening means may be used. Therein also a spring coupling arrangement may be used such that the lever or knob 111 used to turn the screw 130 can be drawn out or put in for coupling with the screw 130, which enables the positioning means 106 to be used also by hand when the knob or lever 111 is not coupled to the screw. For example, when the ends of the positioning means 106 are pressed by hand against the workpiece, the lever or knob is pressed in the same (transverse) direction, whereby e.g. toothed disc clutches connect the lever and the screw to each other for transmission of torque. At the coupling a spring may be arranged between the lever and screw. The lever or knob 111 is rotated and locked in the tilted position and the spring provides resistance for the movement of the positioning means 106. The spring is pressed against the end of the screw and the knob or lever 111 of the positioning means 106 and the rolls of the positioning means 106 against the workpiece. Although the positioning means 106 are fixed by hand to a certain setting in relation to the workpiece because of the spring the rolls of the positioning means 106 may still move in a transverse direction in relation to the spring dimensions and force e.g. if the workpiece width varies when the device is moved longitudinally along the workpiece.

The use of a pulse sensor 110b may be incorporated to detect the specific width of the workpiece. Therein similar pulse sensor techniques may be used as with the sensor 110c of the movable means 104. The positioning means 106 may also incorporate the use of a magnetic sensor 110e moving in relation and at least functional connection to a magnetic strip optionally the same magnetic strip as the one that the sensor 110d may use. The magnetic sensor 110e may be arranged to the movable means 104 such as that the sensor 110d moves linearly with the positioning means 106 and measures its movement in reference to the magnetic strip on the frame 102 surface. Therein the magnetic sensor 110e itself is in the moving part and the magnetic strip is fixed on the frame 102 surface so that the magnetic sensor travels against the magnetic strip when the movable means 104 are moved.

The rolls of the positioning means 106 may comprise material or surface material that allows for tight grip to the workpiece and or flexibility thereof for dents, small peaks and such surface irregularities. Optionally, the positioning means 106 may comprise springs, e.g. at the end of the leadscrew, or other such means for allowing flexibility in relation to the workpiece surface.

The device 100 may also comprise other rolling means 118a, 118b at the bottom of the frame 102 for facilitating movement along the workpiece. The bottom rolls 118a, 118b may also comprise rolling sensors or optical sensors for measuring the rolling of the rolls which may be translated to a measure of distance in the longitudinal direction. In the same manner, the rolls of the positioning means 106 may comprise pulse sensor for tracking the rolling of one or more of the rolls or the movement of strap therein for determining the longitudinal movement of the device 100. This way the longitudinal movement may be optionally or additionally to the laser measurement also tracked at any of the mentioned rolls. The device 100 may hence read the longitudinal location and/or movement from two different measurement sources, which may be used to improve accuracy of the device 100. The bottom rolls may be operated with manual rotation of rotating transmission arrangement 103. Therein accurate adjustment of the longitudinal location may be facilitated with subtly moving the bottom rolls whereas longer distance of longitudinal movement may be made by just pushing the whole device 100 along the workpiece. Preferably, the device 100 is manually operable to position and manually move the device in respect to a workpiece.

Preferably the device 100 retains at least a certain standby mode such as that the reading of the pulse sensors stays in the memory and they needn't be calibrated every time when the device is used. The calibration may be done e.g. in relation to an end of the leadscrew or drive screw by moving the part to that extreme end of the screw.

Every part of the electronics of the device haven't been explicitly depicted but they comprise at least a processor 124 to which the different sensors 110a, 110b, 110c, 110d, 110e, 116 are connected. Further the device 100 comprises a display 122 coupled with the processor 124 to facilitate displaying of the measurements and the location of the measuring point or the position of the tool at the attachment means 112 to the user.

Figure 3A:
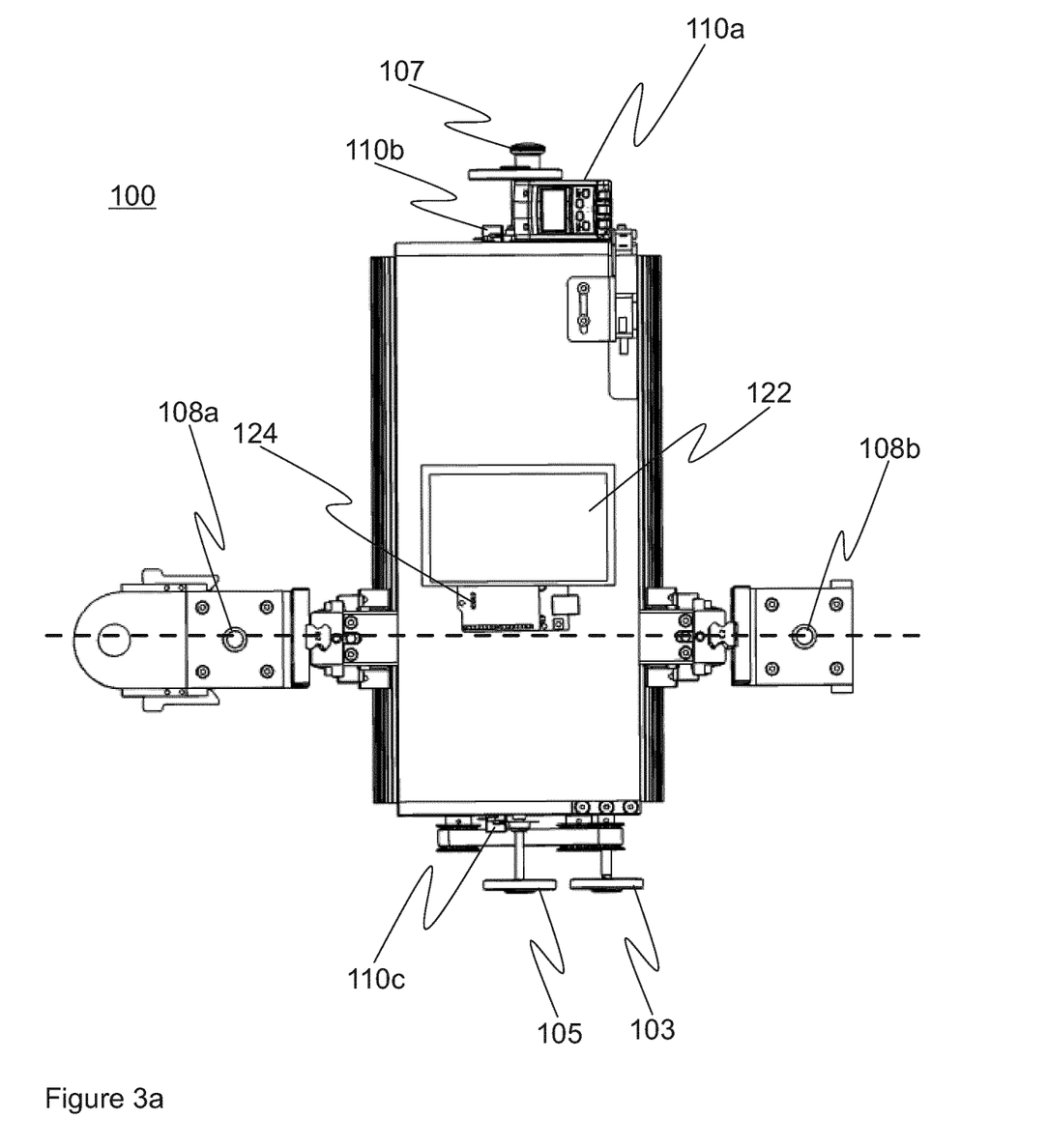
FIG. 3a illustrates a top view of an embodiment of the device in accordance with the present invention.
Figure 3B:
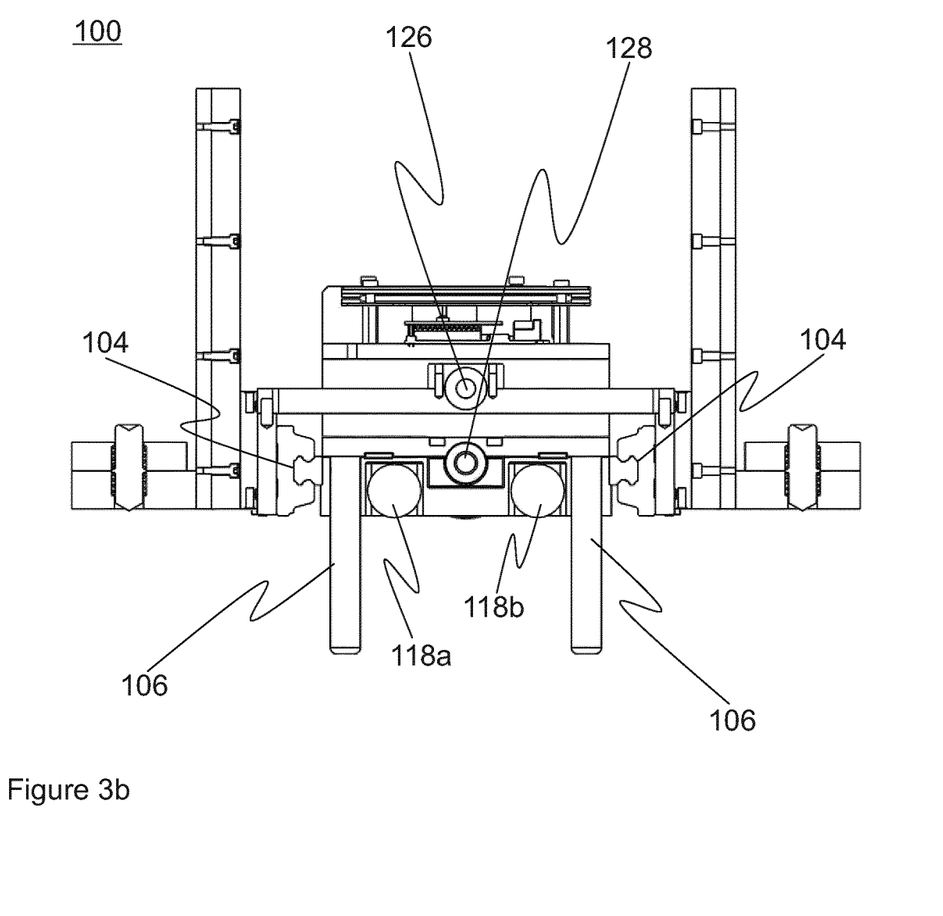
FIG. 3b illustrates a cross-section view of an embodiment of the device in accordance with the present invention.
Figure 3C:
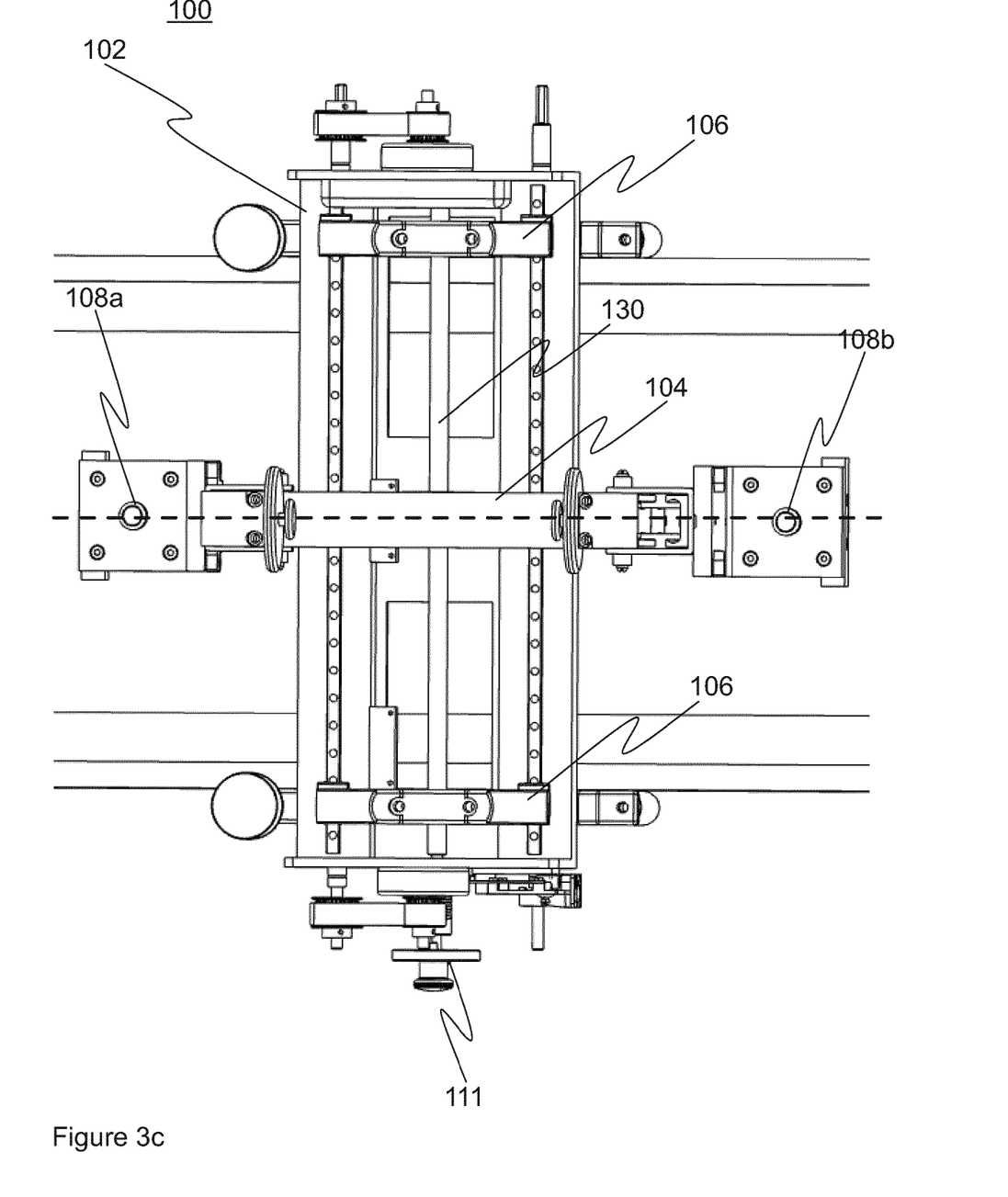
FIG. 3c illustrates a top view of an embodiment of the device in accordance with the present invention without casing.

Referring to FIGS. 3a, 3b and 3c, a top view, a cross-section view and another top view (with casing omitted) of the device is presented for further illustrating the device. Especially the leadscrews and/or the drive screws 126, 128, 130 of the device 100 are shown. As depicted the device 100 may comprise two separate screws 126, 128 for moving the movable means 104 and the positioning means 106 on different screws or the device may comprise a single screw 130 for both the movable means 104 and the positioning means 106.

The device 100 may comprise alternative location for the measuring point(s) 108a, 108b, which may also serve the purpose for attachment of different tools.

The screw 126 is herein illustrated to be moving the movable means 104 which are further supported by rails on both sides of the frame 102. The screw 126 may be turned via a knob 105. Hence, the measuring point(s) 108a, 108b may be moved to a preferred location in transverse respect to the workpiece. Further, so that the frame would be positioned to the workpiece for accurate measurements the positioning means 106 are used to grip on to the workpiece at the sides of the workpiece. The gripping rolls of the positioning means 106 may be arranged to move in synchronicity towards or away from each other via turning of the screw 128 by the knob 107. As depicted, in FIGS. 1c, 1d and 3c the movable means 104 and positioning means 106 may be arranged on a single shared screw 130, which is controlled by knob or lever 111 preferably with a spring coupling arrangement. Fine tuning of the longitudinal location may be done by turning of the knob 103 or pushing the device in a longitudinal direction, which both move the rolling means, i.e. the bottom rolls 118a, 118b and hence situate the measuring point(s) 108a, 108b in a longitudinal respect to the workpiece. A pulse sensor may be also arranged at the knob 103 to track the longitudinal movement.

Consequently, a skilled person may on the basis of this disclosure and general knowledge apply the provided teachings in order to implement the scope of the present invention as defined by the appended claims in each particular use case with necessary modifications, deletions, and additions.

The invention claimed is:

1. A device for determining a location on an elongated workpiece and being manually movable on the workpiece, the device comprising:
   a frame movable in a first direction and moving the whole device on the workpiece in the first direction;
   a positioning means to position the frame in relation to a plurality of sides of the workpiece, wherein the positioning means fix the frame so that the frame does not move in a second direction but so that the frame may move in the first direction of the workpiece;
   a movable means movable in the second direction;
   a measuring point, the movement in the first direction and the second direction being used to move the measuring point in said directions,
   measuring equipment for determining the location of the measuring point in a transverse and a longitudinal respect to the workpiece.

2. The device of claim 1, wherein the measuring equipment comprises at least one laser distance meter for measuring the longitudinal distance to a point of reference.

3. The device of claim 1, wherein the measuring equipment comprises at least two laser distance meters for measuring the distance to two points of reference.

4. The device of claim 1, further comprising a second movable means for moving the measuring point in a perpendicular direction in relation to the workpiece.

5. The device of claim 1, wherein the measuring equipment comprises an optical sensor for measuring movement in the second direction, wherein the optical sensor detects distance by the optical sensor moving linearly with the movable means in the transverse direction in relation to a surface of the frame of the device or a surface of the workpiece.

6. The device of claim 1, wherein the measuring equipment comprises a magnetic sensor for measuring a movement in the second direction, wherein the magnetic sensor detects a distance by the magnetic sensor moving linearly with the movable means in the transverse direction in relation to and in connection with a magnetic strip on the frame of the device.

7. The device of claim 1, wherein the measuring equipment comprises an optical sensor for measuring a movement in the second direction, wherein the optical sensor detects a distance from a rotational movement of a leadscrew or drive screw used to move the movable means.

8. The device of claim 1, wherein the device further comprises an attachment means for attaching at least one tool to the frame.

9. The device of claim 8, wherein the attachment means comprises a cradle for the at least one tool.

10. The device of claim 8, wherein the attachment means comprises a cradle and band attachment means for facilitating a grip support for a magnetic drill of the at least one tool.

11. The device of claim 9, wherein the cradle comprises a plurality of rolling sphere units facilitating movement and load transfer between the workpiece and the at least one tool on the cradle.

12. The device of claim 1, wherein the measuring point comprises a center punch or a hole configured to receive the center punch therethrough.

13. The device of claim 8, wherein the measuring equipment comprises an angle sensor functionally connected to the attachment means for determining the position of the at least one tool attached to the frame.

14. The device of claim 1, wherein the positioning means comprise a plurality of rolls facilitating a longitudinal movement of the frame.

15. The device of claim 14, wherein the measuring equipment comprises a plurality of pulse sensors functionally connected to the plurality of rolls of the positioning means.

16. The device of claim 1, further comprising a rolling means at the bottom of the frame and facilitating a longitudinal movement of the frame.

17. The device of claim 16, wherein the measuring equipment comprises pulse sensors at the rolling means for measuring the longitudinal movement of the frame on the workpiece.

* * * * *